US008827687B2

(12) United States Patent
Schmitt et al.

(10) Patent No.: US 8,827,687 B2
(45) Date of Patent: Sep. 9, 2014

(54) MASS-LESS BELT MANDREL

(75) Inventors: Sandra L. Schmitt, Williamson, NY (US); Kevin Taft, Williamson, NY (US); Karen E. Halliley, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 891 days.

(21) Appl. No.: 12/276,513

(22) Filed: Nov. 24, 2008

(65) Prior Publication Data

US 2010/0129487 A1 May 27, 2010

(51) Int. Cl.
*B29C 35/02* (2006.01)
*B29C 63/14* (2006.01)
*G03G 15/20* (2006.01)

(52) U.S. Cl.
CPC .... *G03G 15/2014* (2013.01); *G03G 2215/2009* (2013.01); *G03G 2215/2016* (2013.01)
USPC ............ 425/470; 242/604; 242/608; 425/471

(58) Field of Classification Search
USPC ...................... 29/895, 895.2, 895.22, 895.23, 29/895.211, 895.213, 895.3; 72/208, 209; 249/175; 242/571, 600, 604, 607, 608, 242/608.4, 609.2, 610.1; 425/470, 471; 399/328
See application file for complete search history.

(56) References Cited

U.S. PATENT DOCUMENTS 973,380 A * 10/1910 Parker ............................. 29/404
1,016,098 A * 1/1912 Sargent ....................... 29/895.31
1,239,504 A * 9/1917 Millar ........................... 242/600
1,459,409 A * 6/1923 McQuaid ...................... 148/213
1,823,956 A * 9/1931 Schroeder ..................... 249/112
1,946,764 A * 2/1934 Schaub ......................... 242/604
1,980,468 A * 11/1934 Brauer .......................... 242/571
2,140,494 A * 12/1938 Clemmons ................. 242/608.4
2,158,994 A * 5/1939 Bureau ...................... 242/608.4
2,159,469 A * 5/1939 Boswin ......................... 242/607
2,161,543 A * 6/1939 Wandrey ....................... 242/607
2,210,878 A * 8/1940 Bureau ...................... 242/608.4
2,232,287 A * 2/1941 Tuerck .......................... 249/175
2,294,098 A * 8/1942 Stromer ........................ 241/294
2,367,796 A * 1/1945 Peterson et al. ................ 492/56
2,501,629 A * 3/1950 Goulding ...................... 101/475
2,992,787 A * 7/1961 Burnie ....................... 242/597.1
3,045,944 A * 7/1962 Ciniglio ..................... 242/118.2
3,507,457 A * 4/1970 Goodman et al. ......... 242/608.4
3,862,736 A * 1/1975 Herro .............................. 249/65
4,034,706 A * 7/1977 Moser ............................. 118/60
4,066,224 A * 1/1978 Hargreaves et al. ....... 242/608.4
4,078,286 A * 3/1978 Takiguichi et al. ............. 492/56
4,189,823 A * 2/1980 Neyenhuys ..................... 29/464
4,239,066 A * 12/1980 Takahashi ..................... 139/452
4,298,330 A * 11/1981 Davis ............................ 425/392
(Continued)

*Primary Examiner* — Yogendra Gupta
*Assistant Examiner* — Emmanuel S Luk
(74) *Attorney, Agent, or Firm* — Ronald E. Prass, Jr.; Prass LLP

(57) ABSTRACT

This invention provides a mandrel used to produce belts where materials are cured onto a belt. Specific examples for illustration purposes are directed to a mandrel used to produce fuser belts for use in electrophotographic marking systems. The mandrel provides for reduced heating temperature during the curing heating step because the only mass required to be heated during curing is the belt and not the prior art solid mandrel. This provides significant advantages, such as faster cycle time, less energy, and less degrading of layer materials. The present mandrel comprises two terminal caps connected by threaded rods around which the belt is positioned for coating and curing.

6 Claims, 4 Drawing Sheets

(56) References Cited

U.S. PATENT DOCUMENTS

| | | | | | |
|---|---|---|---|---|---|
| 4,349,490 | A | * | 9/1982 | Bos | 264/566 |
| 4,412,661 | A | * | 11/1983 | Wise et al. | 242/614.1 |
| 4,422,590 | A | * | 12/1983 | Rathbone | 242/571.8 |
| 4,621,400 | A | * | 11/1986 | van der Graaf | 492/47 |
| 4,920,627 | A | * | 5/1990 | Aikins et al. | 29/402.08 |
| 4,957,586 | A | * | 9/1990 | Keldany et al. | 156/428 |
| 5,071,082 | A | * | 12/1991 | Lefevre et al. | 242/470 |
| 5,468,140 | A | * | 11/1995 | Hoffman et al. | 425/389 |
| 5,605,305 | A | * | 2/1997 | Picton | 242/608 |
| 5,803,396 | A | * | 9/1998 | Dewaele | 242/532.6 |
| 5,934,606 | A | * | 8/1999 | Guild | 242/608.4 |
| 5,954,294 | A | * | 9/1999 | Forsner | 242/604 |
| 6,021,974 | A | * | 2/2000 | Koskelainen | 242/593 |
| 6,338,452 | B1 | * | 1/2002 | Vogel | 242/571 |
| 6,394,943 | B1 | * | 5/2002 | Cormier et al. | 492/47 |
| 6,438,841 | B1 | * | 8/2002 | Fuma et al. | 29/895.32 |
| 7,644,499 | B2 | * | 1/2010 | Smoot et al. | 29/895.23 |
| 8,403,016 | B2 | * | 3/2013 | Snyder et al. | 156/446 |
| 2003/0183718 | A1 | * | 10/2003 | Davis et al. | 242/600 |
| 2004/0051211 | A1 | * | 3/2004 | Mastro et al. | 264/438 |
| 2004/0205967 | A1 | * | 10/2004 | Barnes et al. | 29/895.32 |
| 2006/0090847 | A1 | * | 5/2006 | Peirce | 156/344 |
| 2006/0102772 | A1 | * | 5/2006 | Davis et al. | 242/608.4 |
| 2008/0230170 | A1 | * | 9/2008 | Steinke et al. | 156/110.1 |
| 2010/0065675 | A1 | * | 3/2010 | Taft et al. | 242/571 |

* cited by examiner

MASS-LESS BELT MANDREL

This invention relates to electrostatic marking systems and, more specifically, to a process for making a fuser element useful in said marking system.

BACKGROUND

While the present invention can be used in any suitable belt coating process, for the sake of clarity, it will be described in reference to a fuser belt useful in an electrostatic marking system.

Generally, in a commercial electrostatographic marking or reproduction apparatus (such as copiers/duplicators, printers, multifunctional systems, or the like), a latent image charge pattern is formed on a uniformly charged photoconductive or dielectric member. Pigmented marking particles (toner) are attracted to the latent image charge pattern to develop this image on the dielectric member. A receive member, such as paper, is then brought into contact with the dielectric or photoconductive member and an electric field applied to transfer the marking particle developed image to the receiver member from the dielectric member. After transfer, the receiver member bearing the transferred image is transported away from the dielectric member to a fusion station, and the image is fixed or fused to the receiver member by heat and/or pressure to form a permanent reproduction thereon. The receiving member passes between a pressure roll and a heated fuser belt, roll, or element.

Sometimes copies made in xerographic or electrostatic marking systems have defects caused by improper fusing of the marking material or the fuser itself. The incomplete fusing can be the result of many factors, such as defects in the toner pressure or fuser belts or rolls. Defects in the fuser belts or rolls can be caused by improper compression set properties or flaws resulting from extended use or more often to improper coating of the fuser substrates during imprecise manufacture. Sometimes these flaws occur because of degrading of the silicone coating during the heat-curing step.

An electrographic fuser roll element includes metallic substrates such as aluminum, an elastomeric cover layer, usually a silicone, and at least one coating over the silicone, generally made of a fluoropolymer, such as Teflon® (a trademark of DuPont). In other cases, the fuser belts contain only a polyimide substrate with a Teflon overcoating. The fuser belt element may or may not contain an elastomer cover layer or silicone. In some cases, the electrographic fuser belt element includes polyimide substrates, an elastomer cover layer usually silicone and an overcoating over the silicone, such as Teflon® or Viton® (Trademarks of DuPont).

This invention and its various embodiments are concerned with the manufacturing process for making these coated fuser elements, including fuser belts, rolls, and other configurations. While for clarity the term "fuser structure or member" will be used throughout this disclosure and claims, any suitable fusing configurations are intended to be included, such as belts, rolls, and other fuser structures.

As above noted, fuser belts used in electrostatographic marking systems generally comprise a polyimide layer coated with one or more elastomer layers, such as silicone. Conventional fuser belt polyimide layers for a belt circumference of 950 mm are 75-85 μm. Such thickness has been desired in order to provide strength and durability as the fuser belt presses against the nip of the adjoining compression or pressure roll. For this approximate 950 mm belt, the silicone layer thickness is in the order of 150-600 μm, and the Viton or Teflon overcoating is generally about 15 μm-35 μm thick. However, as the size of the belt changes, appropriate changes in these thicknesses are naturally made. In most embodiments, the fuser belt is provided an outer non-stick surface or covering of polytetra-fluoroethylene, known as Teflon or Viton, trademarks of E.I. DuPont. This outer coating can be of any suitable thickness, depending on the size of the belt.

The use of a fusing member constructed with a non-stick material as a top layer and a heat resistant base layer has been known in the electrostatographic art. Typical non-stick materials that may be used include polytetrafluoroethylene (PTFE), fluorinated ethylene propylene (FEP), perfluoroalkoxy (PFA), polychlorotrifluoroethylene (ECTFE), ethylene-chlorotrifluoroethylene (ECTFE), ethylene-chlorotrifluoroethylene (ECTFE), ethylene-tetrafluoroethylene (ETFE), polyvinylidene fluoride (PVDF), and polyvinyl fluoride (PVF), and blends of these materials.

Fluoropolymer resin by itself, though an excellent non-stick material, is not compliant. Silicone compounds, on the other hand, are compliant. It is known in the art form a fuser member having a material combining the non-stick properties of fluoropolymer resins and the compliant properties of silicone elastomers.

Currently in the prior art, there are two approaches for making Teflon over silicone fuser members. The first approach is to mold the rubber in between the substrate and the fluoro-plastic sleeve, the other method coats the fluoroplastic on the silicone and cures it on the silicone. The latter method is preferred because of improved durability and wear. The coating method typically involves the following process: a substrate is primed, silicone rubber is molded, cured and optionally post cured; the required dimension is usually obtained by grinding; the fluoropolymer layers are applied usually by spraying but may also be flow-coated or powder-coated. The whole member is baked above the melting or sintering point (300° C.) of the fluoropolymer, then the cured surface is usually polished. The fluoropolymer coating layers typically comprise an adhesive (often silane) and/or polyimide/polyamide coating, an optional fluoropolymer primer layer, an optional mid coat layer and a topcoat fluoropolymer layer that is in contact with the media and toner.

There are several advantages to the latter approach. The fluoropolymer layer can be made thinner than a sleeve, less than the ~30 μm thick with a tight distribution. Also, there is more choice in the material that can be applied. This configuration has been shown by machine testing to yield a more durable and therefore a longer lived fuser member than the sleeved approach by better resisting damage from paper; stripper fingers or sensors that contact the member.

A problem with this approach is that silicone is degraded at high temperatures, ~>260° C. PQ defect. In fact, both of these failure modes have been observed indicating there is not sufficient process latitude or process control.

The temperatures required to bake the fluoropolymer layer in a Teflon over silicone system (TOS) usually damages the properties of the silicone rubber, specifically the compression set properties to the point where set of the member is often seen in the form of flat spots or finger-induced dents. Currently, one may process at a temperature lower than that preferred for Teflon cure to improve set properties at the expense of Teflon properties (primarily wear); the result is degraded life due to occasional poor wear or set. Alternately, the TOS member may be "Molded in Place", MIP, where silicone rubber is molded in between an extruded Teflon sleeve and substrate. This approach has the disadvantage of a relatively thick fluoropolymer layer with wider dimensional tolerances and less durability.

Present programs are seeking a 12" belt fuser with a material configuration consisting of a polyimide base with silicone and a Teflon release layer. In order to cure the Teflon, the belt must be heated to temperatures which exceed the material limitations of the silicone. The current lab IR oven which would normally be a viable option to this problem is not large enough to handle the size of this belt. A replacement IR oven is in excess of $200 k with a significant lead time. If using the current belt mandrel, the time to heat up the belt to cure temperatures in a conventional oven would significantly degrade the silicone material properties. There are no known solutions to delivering this belt configuration with the current lab equipment.

SUMMARY

The present invention places the belt in a structure where 2 steel plates are held together by threaded rods affixed and distanced by lock nuts. The belt is nested in a step where the belt length is shorter than the distance between the steps within the plates. The plates have machined holes on each end where the mandrel can be placed on centers for fixturing, or simply placed on one of the faces of the plates during the oven cure process. The belt is firmly held in place without a mandrel supporting behind/inside it, where the belt is the only mass required to reach temperature. The ramp up temperature is now significantly reduced. The belt is manufactured over-length, so the area inside and near the groove which is under-cured will be trimmed to length. The concept of an IR oven is to heat the surface of the area that is being cured, where conventional ovens need to heat the body of the part that is being cured, IR ovens were a solution for rollers with metal cores as the ramp up time to heat the mass of the core in conventional ovens is too long for some material degradations to occur. This process has now become similar to that of IR cure process. This mandrel can also be used for the Teflon or Viton spray process to fixture in the spray booth.

This invention provides a mandrel for manufacturing fuser belts. The mandrel consists of 2 steel plates held together by threaded rods affixed and distanced by lock nuts. The fuser belt is nested in a step where the belt length is shorter than the distance between the steps within the plates. The plates have machined holes on each end where the mandrel can be placed on centers for fixturing, or simply placed on one of the faces of the plates during the oven cure process. The belt is firmly held in place without a solid mandrel supporting behind/inside it, where the belt is the only mass required to be heated to reach curing temperatures for the Teflon. During the heating (curing) process the ramp up temperature is now significantly reduced since the belt is the only part of the assembly that needs to reach the appropriate temperature. The belt is manufactured over-length, so the area inside and near the groove which is under-cured will be trimmed to length. The concept of an IR oven is to heat the surface of the area that is being cured, where conventional ovens need to heat the body of the part that is being cured. This method can be used to produce fuser belts but also has applications for other belts where materials are cured onto a belt. The method eliminates the need to use IR ovens to cure the material; a less expensive conventional oven can be used since the mass being heated is significantly reduced.

There are several advantages of using the mandrel of this invention over the prior art:

A. The process will minimize the energy required during the coating and curing operation, B. Secure materials—better curing of materials, C. There is a significant reduction in cycle time thereby reducing the possibility of degrading materials, D. The relative low cost of the novel mandrel used, E. The spacers used in the mandrel to adjust for different size belts are simple and efficient to use, F. Reduction of size and weight of the mandrel.

DETAILED DESCRIPTION OF DRAWINGS AND PREFERRED EMBODIMENTS

Figure 1:
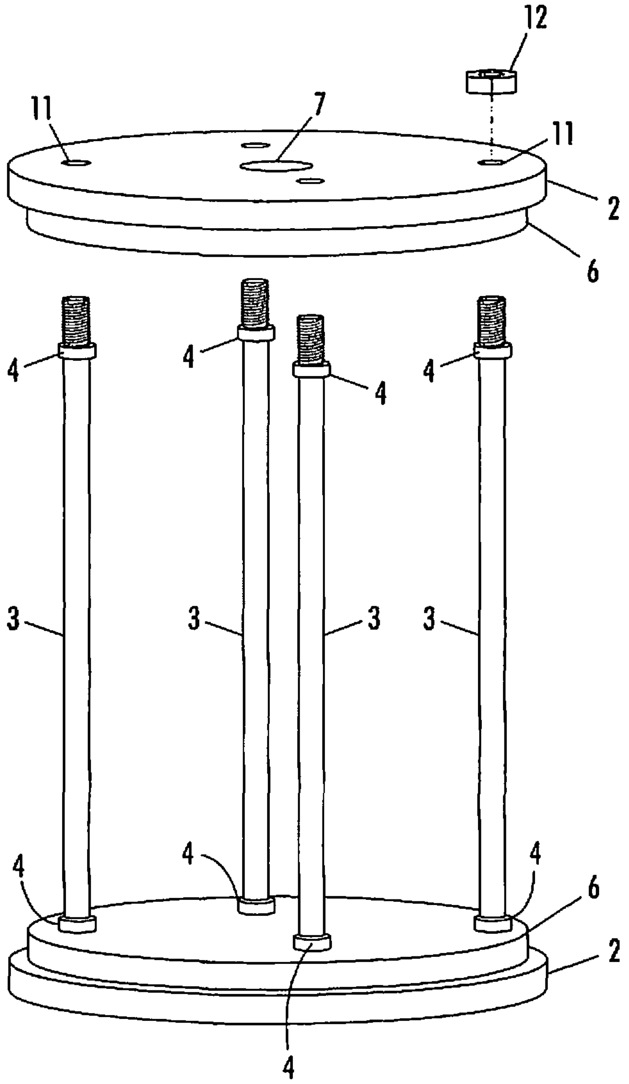
FIG. 1 is a perspective view which illustrates the mandrel of this invention in a disconnected view.

In FIG. 1 an embodiment of the mandrel 1 present invention is illustrated comprising two steel plates or caps 2 held together by threaded rods 3 affixed and distanced by lock nuts 4. The fuser belt 5 is nested in a step 6 where the belt 5 length is shorter than the distance between the steps 6 within the plates or caps 2. The plates 2 have machined holes 7 on each end where the mandrel 1 can be placed on centers 8 for fixturing or simply placed on one of the faces of the plates 2 during the oven cure process which is about 600-750 degrees. The belt 5 is firmly held in place without a solid mandrel supporting inside it, and where the belt 5 is the only mass required to be heated to reach curing temperatures for the Teflon or Viton 9 overcoating. During the heating (curing) step the ramp up time is now significantly reduced by 35 minutes, since the belt is the only part of the assembly that needs to reach the appropriate curing time and temperature. The belt 5 is manufactured over length, so the area inside and near the groove or steps 6 which is under-cured will be subsequently trimmed to length. This mandrel 1 and method eliminates the need to use IR ovens to cure the material, a less expensive oven can be used since the mass being heated is significantly reduced.

To make a fuser roll rather than a fuser belt, the cured belt merely needs to be superimposed on an aluminum core or substrate.

Figure 2:
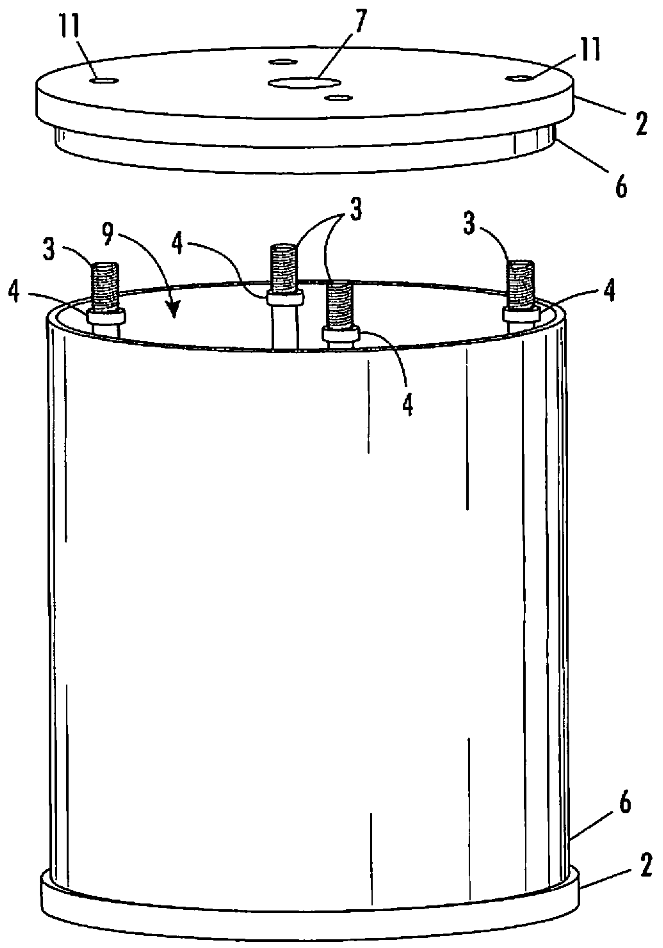
FIG. 2 is a perspective view which illustrates the mandrel of this invention with the attached coated belt after the coating and curing.

In FIG. 2, the mandrel 1 of FIG. 1 is shown with the fuser belt 5 nested on it. Note that the belt terminal portions 10 fit tightly against the adjustable lock nuts 4. The caps 2 have apertures 11 which align with threaded rods 3 and can be secured by outer nuts 12 (only one shown for clarity). Any suitable number of rods 3 and nuts 4 or 12 may be used.

Figure 3A:
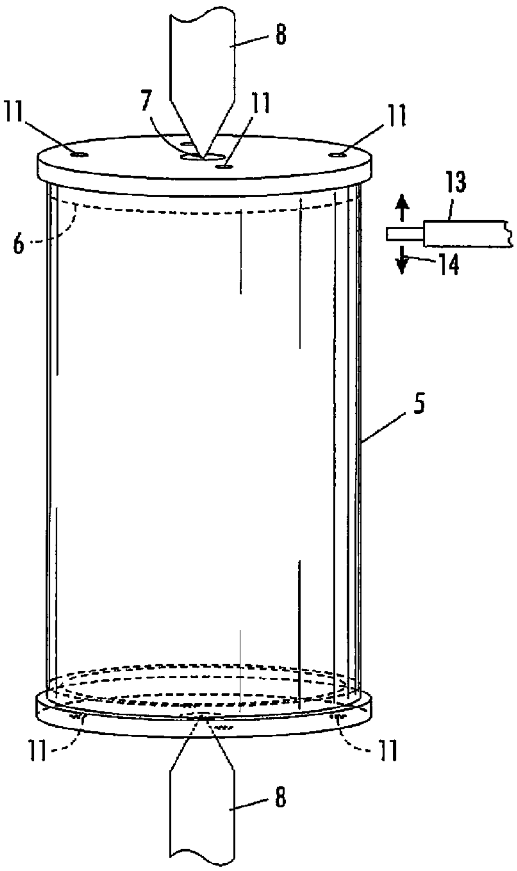
FIG. 3A is a perspective view of the mandrel of this invention with the belt attached during the coating step, using center projections.
Figure 3B:
FIG. 3B is a center rod upon which the mandrel can rotate in place of the center projections of FIG. 3A.

In FIG. 3A the mandrel 1 is shown as it is connected via center holes 7 to center projections 8 for rotation of the mandrel 1 during the coating process by spray coater 13. Coater 13 moves up and down as shown by arrows 14 as the mandrel 1 rotates along center projections 8 to ensure that the coatings cover the entire belt 5. In place of center projections 8, the center rod 16 of FIG. 3B will replace projections 8 and be used upon which the mandrel 1 will rotate during coating and curing. The center rod 16 will merely fit through apertures 7 for and during rotation.

Figure 4:
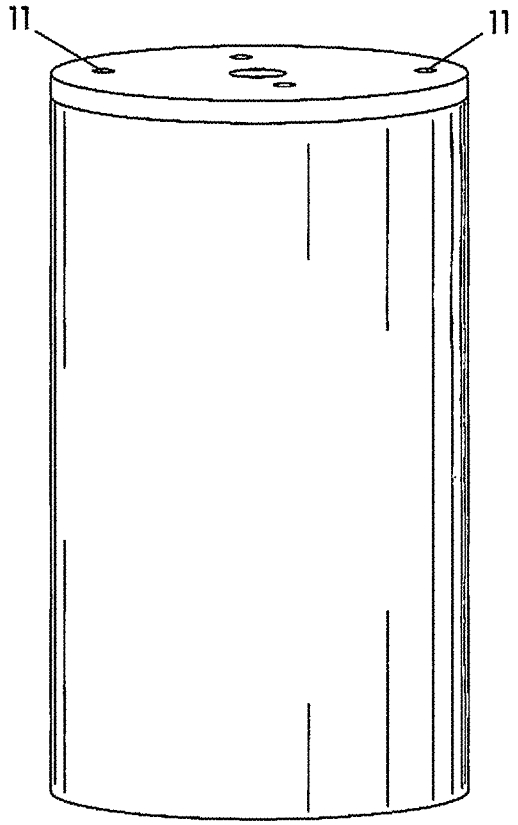
FIG. 4 PRIOR ART
FIG. 4 is a typical prior art used solid mandrel for coating and curing fuser belts.

FIG. 4 shows a typical solid mandrel 15 which is heavier and requires substantially more heat during the curing step than the present mandrel In summary, embodiments of this invention provide a mandrel for the production of a coated endless belt. The belt comprises two metal rounded caps or plates connectable by threaded rods. These caps have outer and inner faces. The rods have belt distancing locking nuts movably positioned thereon. The caps have apertures therein configured to receive the threaded rods and configured to secure the caps to the rods to form thereby an inner open housing. The locking nuts positioned on said threaded rods are located in the open housing. The locking nuts are configured to securely hold the coated belt in place as the belt is wound around outside portions of the rods before and during a curing operation. The locking nuts are located at both terminal end portions of the threaded rods to provide thereby upper and lower locking nuts. The metal caps comprise steps located in their inner faces to form upper and lower steps; these steps are configured to receive and securely hold the endless belt during the curing operation. The belt length is shorter than a distance between the upper and lower locking nuts, and the upper and lower steps. Metal caps comprise steps located in said inner faces which are configured to abut said belt when positioned thereon. These rounded caps comprise a central aperture, said aperture configured to receive center projections or center rods for rotating the mandrel during belt coating and heating steps. The caps and the threaded rods are secured together by outside connectors.

Specifically, embodiments of this invention are used to produce fuser belts. The fuser belt is useful in an electrophotographic marking system. The mandrel comprises two metal rounded caps connectable by threaded rods. The rounded caps have outer and inner faces. The threaded rods have belt distancing locking nuts positioned thereon. The threaded rods are configured to have the belt wound around them. The caps have apertures therein configured to receive these threaded rods and configured to secure the caps to the rods to form thereby an inner open housing. The locking nuts are positioned on the threaded rods and located in the open housing. The locking nuts are configured to securely hold the coated belt in place as the belt is wound around outside portions of threaded rods during a curing operation.

The mandrel is configured to support belt layered materials comprising a base layer of a polyimide, an intermediate layer of an elastomer, and an overcoating layer selected from the group consisting of Teflon, Viton and mixtures thereof. The mandrel is configured to support the belt comprising about a 75-85 μm thick layer of a polyimide, about a 150-600 μm layer of a silicone elastomer, an about from 15-35 μm layer of an overcoating when a belt having a circumference of about 38 inches is being processed and cured. The locking nuts are located at both terminal end portions of the threaded rods to provide thereby upper and lower locking nuts. The metal caps comprise steps located in their inner faces to form upper and lower steps. The steps are configured to receive and securely hold the endless belt during the curing operation. The belt length is shorter than a distance between upper an lower locking nuts and upper and lower steps. The metal caps comprise steps located in their inner faces. The steps are configured to abut the belt when the belt is positioned thereon. The rounded caps comprise a central aperture. This aperture is configured to receive center projections or center rods for rotating the mandrel during belt coating and heating steps. The caps and threaded rods are secured together by outside connectors.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An endless belt molding apparatus comprising in combination:

a mandrel tool with an inner open housing comprising:

two metal rounded caps connectable by threaded rods, said caps having outer and inner faces, said threaded rods having belt distancing locking nuts movably positioned thereon; said caps having apertures therein configured to receive said threaded rods and configured to secure said caps to said threaded rods, said belt distancing locking nuts positioned on said threaded rods and located in said inner open housing, said belt distancing locking nuts configured to securely hold an endless belt in place as said endless belt is wound around outside portions of said threaded rods during a curing operation;

at least one internal open space formed between the two metal rounded caps and configured to allow uniform heating of the endless belt during a curing process since it is the only part that needs to reach an appropriate curing time and temperature; and an oven to heat the endless belt on the mandrel tool with an inner open housing for a predetermined curing time and temperature;

wherein the two metal rounded caps comprise steps located in their inner faces to form upper and lower steps, said upper and lower steps configured to receive and securely hold said coated endless belt during said curing process;

wherein during the curing process a ramp up temperature is reduced since the coated endless belt is an only part that needs to reach an appropriate temperature;

wherein one of the apertures is configured to receive a rod for rotating the endless belt during coating and heating.

2. The endless belt molding apparatus of claim 1 wherein said belt distancing locking nuts are located at both terminal end portions of said threaded rods to provide thereby upper and lower locking nuts.

3. The endless belt molding apparatus of claim 2 wherein a belt length is shorter than a distance between said upper and said lower locking nuts.

4. The endless belt molding apparatus of claim 1 wherein said metal rounded caps comprise steps located in said inner faces, said steps configured to abut said coated endless belt when positioned thereon.

5. The endless belt molding apparatus of claim 1 wherein said metal rounded caps comprise a central aperture, said aperture configured to receive center projections or center rods for rotating said mandrel during belt coating and heating steps.

6. The endless belt molding apparatus of claim 1 wherein said metal rounded caps and said threaded rods are secured together by outside connectors.

* * * * *